US012590607B2

(12) United States Patent (10) Patent No.: US 12,590,607 B2
Kato et al. (45) Date of Patent: Mar. 31, 2026

(54) BEARING

(71) Applicant: NTN CORPORATION, Osaka (JP)

(72) Inventors: Masaki Kato, Kuwana (JP); Mitsuhiko Yoshikawa, Kuwana (JP)

(73) Assignee: NTN CORPORATION, Osaka (JP)

( * ) Notice: Subject to any disclaimer, the term of this patent is extended or adjusted under 35 U.S.C. 154(b) by 36 days.

(21) Appl. No.: 18/639,122

(22) Filed: Apr. 18, 2024

(65) Prior Publication Data

US 2024/0352976 A1 Oct. 24, 2024

(30) Foreign Application Priority Data

Apr. 21, 2023 (JP) ................................. 2023-070281

(51) Int. Cl.
*F16C 19/06* (2006.01)
*F16C 23/08* (2006.01)
*F16C 33/58* (2006.01)
*F16C 35/063* (2006.01)
(52) U.S. Cl.
CPC ............ *F16C 35/063* (2013.01); *F16C 19/06* (2013.01); *F16C 23/08* (2013.01); *F16C 33/586* (2013.01)
(58) Field of Classification Search
CPC ........ F16C 19/06; F16C 23/08; F16C 23/082; F16C 23/084; F16C 33/586; F16C 35/063; F16B 21/186
See application file for complete search history.

(56) References Cited

U.S. PATENT DOCUMENTS

| | | | | |
|---|---|---|---|---|
| 3,588,208 A | * | 6/1971 | Kane et al. ........... | F16C 35/063 384/541 |
| 4,537,519 A | | 8/1985 | LaRou et al. | |
| 6,840,679 B2 | * | 1/2005 | Lenick ................. | F16C 35/063 384/537 |
| 7,306,375 B2 | * | 12/2007 | Lenick ................. | F16C 33/586 384/537 |
| 11,536,318 B1 | * | 12/2022 | Bauer ................... | F16C 35/063 |
| 2001/0010738 A1 | * | 8/2001 | Johnson ............... | F16D 1/0864 384/537 |
| 2015/0104125 A1 | * | 4/2015 | Kamath ............... | F16C 35/045 384/564 |
| 2021/0285497 A1 | | 9/2021 | Baracca et al. | |

FOREIGN PATENT DOCUMENTS

| | | | | |
|---|---|---|---|---|
| FR | 2869081 A1 | * | 10/2005 | ............ F16C 35/073 |
| JP | 61-74913 | | 4/1986 | |
| JP | 3055655 | | 1/1999 | |
| JP | 3184486 | | 6/2013 | |

OTHER PUBLICATIONS

FR2869081A1_DESCRIPTION.*

* cited by examiner

*Primary Examiner* — Phillip A Johnson

(57) ABSTRACT

A bearing includes a plurality of claws located in a circumferential direction at an end face of an inner ring and protruding from the end face of an inner ring in an axial direction. A lock mechanism can be used to fasten the claws to a shaft. At least one of the plurality of claws has an opening provided therein.

8 Claims, 4 Drawing Sheets

BEARING

CROSS REFERENCE TO THE RELATED APPLICATION

This application is based on and claims Convention priority to a Japanese patent application No. 2023-070281 filed Apr. 21, 2023, the entire disclosure of which is herein incorporated by reference as a part of this application.

BACKGROUND OF THE INVENTION

Field of the Invention

The present invention relates to a bearing and, for example, concerns features that can be applied to a concentric collar bearing for a bearing unit to be used in general industrial machinery.

Description of Related Art

A wide variety of bearing units with self-aligning capability have been proposed. To facilitate fitting with shafts, etc., conventional bearing units are designed to provide loose fit between a shaft and the inner diameter of a bearing, and a setscrew, an eccentric collar, or a tapered adapter is traditionally used as a device to lock the bearing and the shaft together (e.g., US 2021/0285497 A1, JP 3184486 U, JP S61-074913 A, JP 3055655 U, and U.S. Pat. No. 4,537,519 A). Among them, a setscrew system is more commonly used. However, by tightening the setscrew, the residual clearance between the shaft and the inner diameter of the inner ring is inevitably turned into an offset of the center of the shaft relative to the center of rotation of the bearing. This is problematic as it becomes the source of vibrations which increase in magnitude under rotations with higher speeds. Similar problems arise with the use of eccentric collars.

For this reason, a bearing with a tapered adapter system is usually employed for applications that are subject to high speed rotations. The tapered adapter system essentially eliminates center offset because the tightening of a tapered sleeve gets rid of the clearance between the shaft and the inner diameter of the inner ring, and is therefore excellent in terms of precision rotations and reduced vibrations. However, it has more components than other bearing systems and requires modification of internal structures in order to be used with the same shaft diameter as other bearing systems, which results in increase of the dimensions of the bearing as a whole and is thereby disadvantageous from the perspective of user-friendliness and dimensional constraints.

To address this issue, a device (hereinafter referred to as a concentric collar) such as the ones described in US 2021/0285497 A1, JP 3184486 U and JP S61-074913 A could be used to fit a shaft and the inner ring of a bearing together in a concentric manner. This concentric collar is tightened to deform claws provided on an end of the inner ring of the bearing to clamp the shaft and the bearing. For this reason, the claws on the end of the bearing should have such shape and thickness that allow the claws to be deformed (or shrunk in diameter) with ease.

For easy deformation of the claws, the shapes of the claws may be customized accordingly, or the hardnesses of the claws can be reduced. Induction hardening could be solely applied to raceways to achieve reduced hardnesses of the claws. However, for conventional insert bearings, hardening and tempering are applied to the entire bearing rings. Thus, heat treatment equipment used for the conventional insert bearings cannot be relied upon to this end. Meanwhile, soft materials suitable for deformation of the claws could be chosen for material of the bearing. In this case, however, the service life of the bearing may become shorter than that of a bearing in which a standard bearing steel is used.

For customized shapes of the claws, shapes like those described in US 2021/0285497 A1 and U.S. Pat. No. 4,537,519 A are effective to fit the bearing to shafts. Yet, JP 3055655 U explains that the shapes of claws such as those described in US 2021/0285497 A1 and U.S. Pat. No. 4,537,519 A generally and slightly complicate the total processing steps for the bearing. Still, the claws proposed in JP 3055655 U lack flexibility. Each of the claw shapes described therein is thinly designed with careful attention to flexibility and strength. Thus, further sophistication of these claws in thickness aspects would be challenging, if a demand for further flexibility of the claws arose.

SUMMARY OF THE INVENTION

An object of the present invention is to provide a bearing which allows, for example, the use of existing equipment for the manufacture of the bearing and which, at the same time, makes sure that an extent of contact that is comparable to those of conventional counterparts exists between the bearing and a shaft.

The present invention provides a bearing which includes: an inner ring; an outer ring; a plurality of rolling elements disposed between the inner ring and the outer ring; and a plurality of claws located in a circumferential direction at an end face of the inner ring and protruding from the end face of the inner ring in an axial direction. At least one of the plurality of claws has an opening provided therein.

According to this configuration, due to the opening which is provided in a respective one of the claws, the rigidity of the respective one of the claws on the inner ring is lower than, for example, the rigidity of a raceway of the inner ring. This leads to a greater clamping force acting between the shaft and the inner diameters of the claws for locking the bearing to the shaft, as compared to those configurations lacking openings in the claws, for example. At the same time, there is little or no decrease in the contact surface area between the shaft and the inner diameter surfaces of the claws, which helps keep the clamping force during the operation of the bearing. The machining range for the opening can be adapted to the surface area of a given claw, which promotes compatibility with existing claw shapes and provides opportunities for further flexibility.

In regard to heat treatments for the bearing, the entire inner ring may be subjected to hardening and tempering, followed by induction annealing which is only carried out on the claws, for example. This can minimize the changes that need to be made to the existing equipment. Therefore, for example, existing equipment can be used for the manufacture of the bearing while at the same time making sure that an extent of contact that is comparable to those of conventional counterparts exists between the bearing and a shaft.

Each of the claws may have a thickness smaller than the maximum thickness of the inner ring, as measured in a radial direction, and each of the claws may define an inner diameter corresponding to the inner diameter of the inner ring. This can make the claws more flexible than when the claws have the same thicknesses as the maximum thickness of the inner ring and can further ensure that the clamping force which will act between the shaft and the inner diameters of the claws increases.

The outer ring can have an outer peripheral surface which is arranged in a bearing housing in a self-aligning manner. This feature can be applied to a bearing with a self-aligning capability.

The opening may be located in a respective one of the claws in a range that spans from the center of the respective one of the claws towards a raceway groove of the inner ring in the axial direction. The rigidity of the claws can be lowered more effectively by bringing the location for providing the opening closer to a raceway groove of the inner ring and therefore to the bases of the claws.

The opening may have a length which is equal to or shorter than 50% of the length of a respective one of the claws, as measured in the axial direction. In this way, the extent of contact between the shaft and the inner diameters of the claws can be maintained with little or no compromise. If the length of the opening exceeds 50% of the length of the respective one of the claws, as measured in the axial direction, the extent of contact between the shaft and the inner diameters of the claws could get compromised, making it difficult to maintain the clamping force between the shaft and the inner diameters of the claws.

The opening may have a length which is equal to or shorter than 60% of the length of a respective one of the claws, as measured in the circumferential direction. In this way, the extent of contact between the shaft and the inner diameters of the claws can be maintained with little or no compromise. If the length of the opening exceeds 60% of the length of the respective one of the claws, as measured in the circumferential direction, the extent of contact between the shaft and the inner diameters of the claws could get compromised, making it difficult to maintain the clamping force between the shaft and the inner diameters of the claws.

The claws may have hardnesses which are lower than the hardness of a raceway groove of the inner ring. For instance, the entire inner ring may be subjected to hardening and tempering, followed by induction annealing which is only carried out on the claws, and this can make the hardnesses of the claws lower than the raceway groove. Accordingly, the claws become flexible and can further ensure that the clamping force which will act between the shaft and the inner diameters of the claws increases.

The present invention provides a bearing device which includes: an inner ring; an outer ring arranged outwards of the inner ring; a plurality of rolling elements disposed between the inner ring and the outer ring; a shaft which is fittedly coupled to the inner diameter surface of the inner ring; a plurality of claws located in a circumferential direction at an end face of the inner ring and protruding from the end face of the inner ring in an axial direction, and a lock mechanism which fastens the claws to the shaft. At least one of the plurality of claws has an opening provided therein.

Any combinations of at least two features disclosed in the claims and/or the specification and/or the drawings should also be construed as encompassed by the present disclosure. Especially, any combinations of two or more of the claims should also be construed as encompassed by the present disclosure.

BRIEF DESCRIPTION OF THE DRAWINGS

The present disclosure will be more clearly understood from the following description of preferred embodiments made by referring to the accompanying drawings. However, the embodiments and the drawings are given merely for the purpose of illustration and explanation, and should not be used to delimit the scope of the present disclosure, which scope is to be delimited by the appended claims. In the accompanying drawings, alike numerals are assigned to and indicate alike parts throughout the different figures, and:

DESCRIPTION OF EMBODIMENTS

First Embodiment

Bearings in accordance with embodiments of the present invention will be described in connection with FIGS. 1 to 3B. The bearings can be applied to a bearing unit which will be further discussed later and which can be used in applications such as general industrial machinery, for example.
<General Structure of Bearing>

Figure 1:
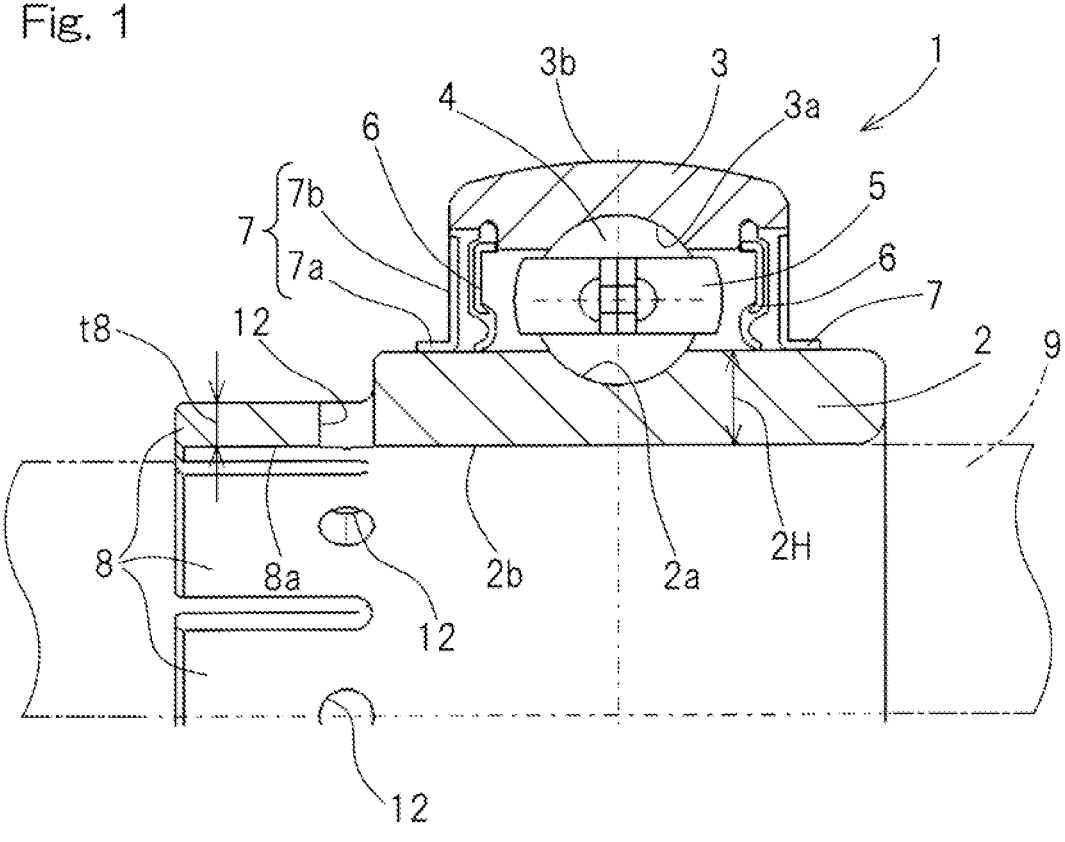
FIG. 1 shows a longitudinal cross sectional view of a bearing in accordance with a first embodiment of the present invention.

Turning to FIG. 1, a bearing 1 in accordance with embodiments is in the form of a ball bearing which includes: inner and outer rings 2, 3; a plurality of rolling elements 4 such as balls; a cage 5; seals 6; and slingers 7. The inner and outer rings 2, 3 are made from bearing steel, and the balls 4 are formed of steel balls, for example. The inner ring 2 is formed to have a length longer than that of the outer ring 3 in an axial direction, and has a plurality of claws 8 located in a circumferential direction at an end face of the inner ring and protruding from the end face of the inner ring in the axial direction. For instance, a shaft 9 and the inner diameter of the inner ring 2 are designed to be loose-fitted to each other. Then, a collar 10 (FIG. 6) serving as a lock mechanism is used to fasten the plurality of claws 8 to the shaft 9. A bearing device includes such a bearing 1 and shaft 9, in which the shaft 9 is fittedly coupled to the inner diameter surface of the inner ring 2 of the bearing 1.

The outer ring 3 has an outer peripheral surface 3b that is formed to be convex-spherical and that slidably fits to the spherical inner diameter of a bearing housing which will be further discussed later. Hence, the outer peripheral surface 3b of the outer ring 3 is arranged in the bearing housing in a self-aligning manner. The plurality of rolling elements 4 are disposed between the raceway grooves 2a, 3a of the inner and outer rings 2, 3 and are retained by the cage 5. The inner and outer rings 2, 3 delimit a bearing space which is sealed at the opposite ends thereof by the seals 6, 6 which are, for example, in the form of contact seals. Grease serving as a lubricant is sealed in the bearing space.
<Slinger>

The slingers 7 are each arranged in the axial direction outwards of a respective one of the seals 6 to further assist the sealing of the bearing space. Each of the slingers 7 is formed to have an L-shaped cross section which is defined by a cylindrical section 7a fixedly fitted to the outer peripheral surface of the inner ring 2 and an upright section 7*b* extending radially outwards from the axially inward end of the cylindrical section 7*a*. The upright section 7*b* has an outer diameter end which faces the inner peripheral surface of the outer ring across a predetermined radial clearance.
<Rigidity Lowering Means>
<Claws>

Figure 2:
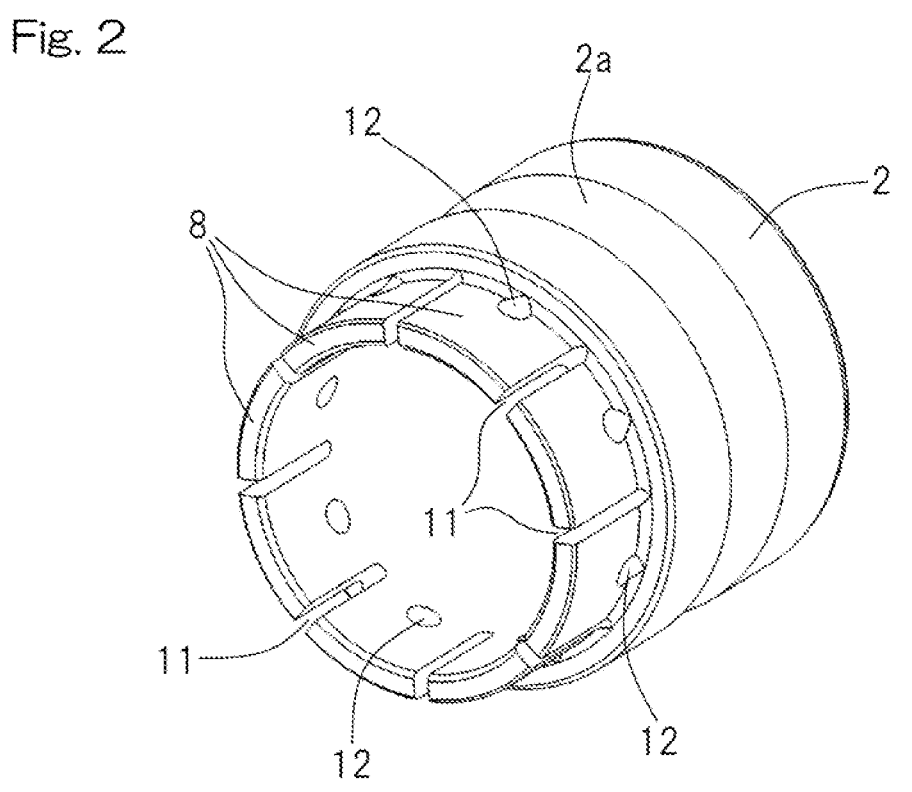
FIG. 2 shows a perspective view of an inner ring of the bearing.

Turning to FIG. 2, the plurality of claws 8 (which are, in the instant example, eight claws) are provided in the circumferential direction on the inner ring 2 as rigidity lowering means. Eight slits 11 are defined between the adjacent claws 8, 8 in the circumferential direction. The rigidity of the claws 8 can be lowered by increasing the number of the slits 11 between the claws 8, 8. It should be understood that the number of the slits 11 between the claws 8, 8 can be selected as appropriate as a function of the flexibility to be provided to each of the claws 8 and design specifications such as the size of the bearing. The number of the slits 11 between claws 8, 8 may be fewer than eight or can be increased to nine or more.

Figure 3A:
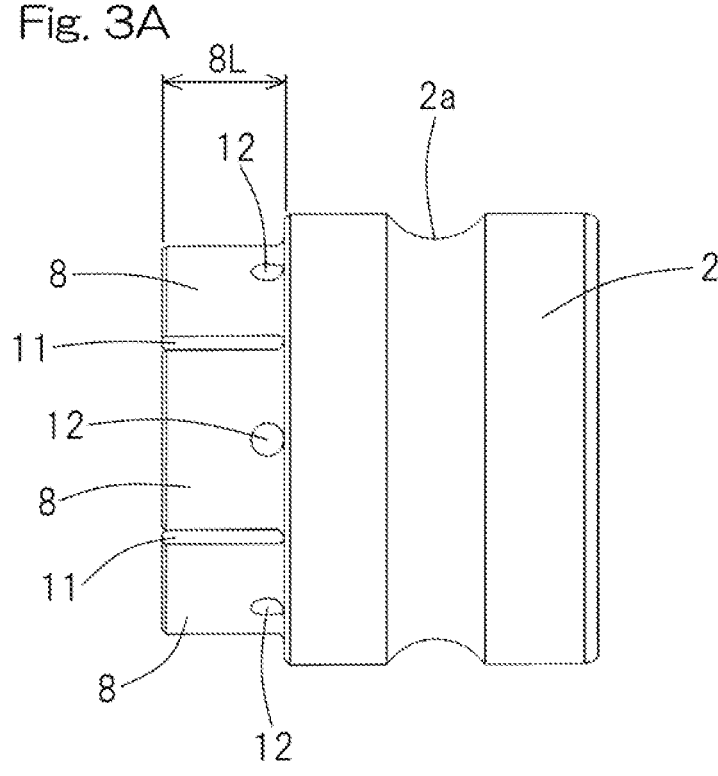
FIG. 3A shows a front elevational view of the inner ring.

Turning back to FIG. 1, each of the claws 8 has a thickness smaller than the maximum thickness 2H of the inner ring 2, as measured in a radial direction. For example, the thickness t8 of each of the claws 8 is equal to about 50% of the maximum thickness 2H of the inner ring 2. Each of the claws 8 defines an inner diameter 8*a* corresponding to the inner diameter 2*b* of the inner ring. As illustrated in FIG. 3A, each of the claws 8 has an opening 12 provided therein. The opening 12 is a through hole having a round shape and extending through a respective one of the claws 8 in the radial direction. It should be understood that a round shape is only one of the non-limiting examples of the shape of the opening 12.

Figure 3B:
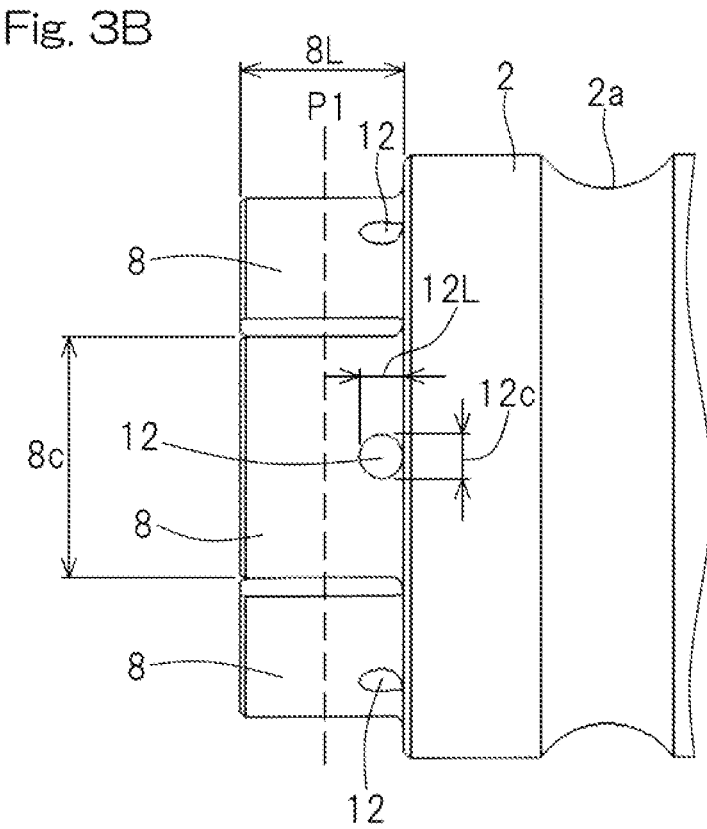
FIG. 3B shows a fragmentary enlarged, front elevational view of the inner ring, highlighting claws thereon.

The rigidity of the claws 8 can be lowered more effectively by bringing the location of the opening 12 in the axial direction closer to the raceway groove 2*a* of the inner ring 2 and therefore to the bases of the claws 8. Also, the opening may extend in this axial location for no more than approximately 50% of the length 8L of a respective one of the claws 8, as measured in the axial direction, to help maintain the extent of contact between the shaft 9 and the inner diameter surfaces of the claws 8 with little or no compromise. More specifically, as illustrated in FIG. 3B, the opening 12 is located in a respective one of the claws 8 in a range that spans from the center P1 of the respective one of the claws 8 towards the raceway groove 2*a* of the inner ring 2 in the axial direction. In addition, the opening 12 has a length 12L which is at most 50% of the length 8L of the respective one of the claws 8, as measured in the axial direction. That is, the opening 12 has a length 12L which is equal to or shorter than 50% of the length 8L of the respective one of the claws 8, as measured in the axial direction. The opening 12 has a length 12*c* which is at most 60% of the length 8*c* of the respective one of the claws 8, as measured in the circumferential direction. That is, the opening 12 has a length 12*c* which is equal to or shorter than 60% of the length 8*c* of the respective one of the claws 8, as measured in the circumferential direction.
<Heat Treatment, Etc.>

The inner and outer rings 2, 3 made from bearing steel according to FIG. 1 are each subjected to hardening and tempering in their entirety, as is the case with standard bearings. The difference is that induction annealing is carried out on the claws 8 of the inner ring 2 to give them flexibility, after the inner ring 2 has been hardened and tempered in its entirety. This makes the hardnesses of the claws 8 on the inner ring 2 lower than the hardness of the raceway groove 2*a* of the inner ring 2. Thus, the claws 8 have hardnesses which are lower than the hardness of the raceway groove 2*a* of the inner ring 2. Whether the hardnesses of the claws 8 are lower than the hardness of the raceway groove 2*a* of the inner ring 2 can be verified by comparing the hardnesses of the surface of the raceway groove 2*a* and the outer peripheral surfaces or inner peripheral surfaces of the claws 8 in a known manner on the basis of their Rockwell or Shore hardnesses, for example.
<Effects and Benefits>

According to the bearing 1 shown in FIG. 1, due to the opening 12 which is provided in a respective one of the claws 8, the rigidity of the respective one of the claws 8 on the inner ring 2 is lower than, for example, the rigidity of a raceway of the inner ring 2. This leads to a greater clamping force acting between the shaft 9 and the inner diameters 8*a* of the claws 8 for locking the bearing 1 to the shaft 9, as compared to conventional configurations lacking openings in the claws, for example. At the same time, there is little or no decrease in the contact surface area between the shaft 9 and the inner diameter surfaces of the claws 8, which helps keep the clamping force during the operation of the bearing. The machining range for the opening 12 can be adapted to the surface area of a given claw 8, which promotes compatibility with existing claw shapes and provides opportunities for further flexibility.

In regard to heat treatments for the bearing, the entire inner ring 2 can be subjected to hardening and tempering, followed by induction annealing which is only carried out on the claws 8, for example. This can minimize the changes that need to be made to the existing equipment. Therefore, for example, existing equipment can be used for the manufacture of the bearing while at the same time making sure that an extent of contact that is comparable to those of conventional counterparts exists between the bearing 1 and the shaft 9.

Each of the claws 8 has a thickness smaller than the maximum thickness 2H of the inner ring 2, as measured in the radial direction, and each of the claws 8 defines an inner diameter 8*a* corresponding to the inner diameter 2*b* of the inner ring 2. This can make the claws 8 more flexible than when the claws have the same thicknesses as the maximum thickness of the inner ring 2 and can further ensure that the clamping force which will act between the shaft 9 and the inner diameters 2*b* of the claws increases. The entire inner ring 2 is subjected to hardening and tempering, followed by induction annealing which is only carried out on the claws 8, and this can make the hardnesses of the claws 8 lower than the raceway groove 2*a*. Accordingly, the claws 8 become flexible and can further ensure that the clamping force which will act between the shaft 9 and the inner diameters 8*a* of the claws 8 increases.

Further Embodiments

In the remainder of the discussions, features may correspond to those previously discussed with respect to preceding embodiment(s). They are numbered similarly, but will not be further described to avoid redundant discussions. Where only a subset of features are discussed with respect to an embodiment, the remaining features should be regarded as analogous to those of the preceding embodiment(s) unless otherwise noted. Identical features produce identical effects and benefits. In addition to particular combinations of features discussed with respect to each of the embodiments, the embodiments themselves can be partially combined with each other, unless such combinations are found to be inoperable.

Figure 4:
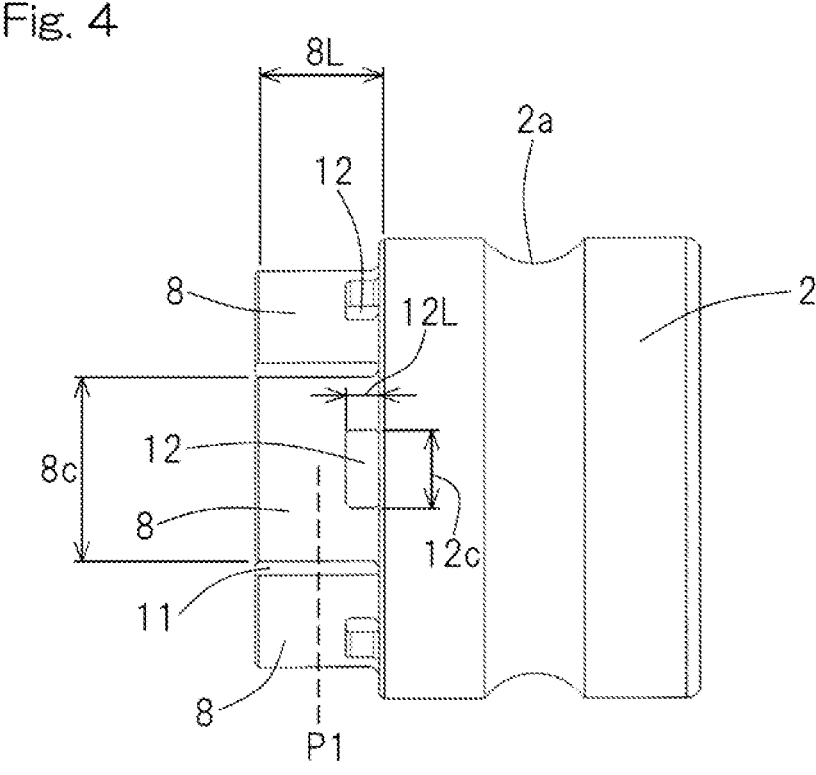
FIG. 4 shows a front elevational view of an inner ring of a bearing in accordance with a second embodiment of the present invention.

Second Embodiment (FIG. 4)

Turning to FIG. 4, an opening 12 in the form of a rectangular hole may be provided in a respective one of the claws 8. As is the case with the preceding embodiment(s), the opening 12 in the instant case is located in the respective one of the claws 8 in a range that spans from the center P1 of the respective one of the claws 8 towards the raceway groove 2a of the inner ring 2 in the axial direction. In addition, the opening 12 has a length 12L which is at most 50% of the length 8L of the respective one of the claws 8, as measured in the axial direction. The opening 12 has a length 12c which is at most 60% of the length 8c of the respective one of the claws 8, as measured in the circumferential direction. The second embodiment produces similar effects and benefits to those of the preceding embodiment(s).

Figure 5:
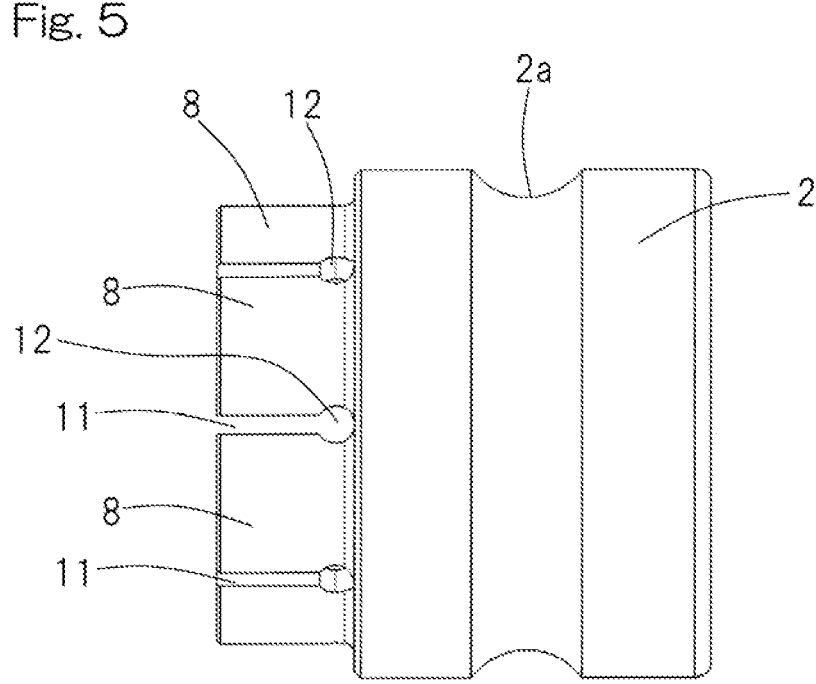
FIG. 5 shows a front elevational view of an inner ring of a bearing in accordance with a third embodiment of the present invention.

Third Embodiment (FIG. 5)

Turning to FIG. 5, the opening 12 can be designed in such a location in the circumferential direction that locally enlarges a respective one of the slits 11 between the claws 8. It should be noted, however, that, if the size of the opening 12 coincides with those of the slits 11, the opening 12 should be provided not at the slits 11, but rather at the center of a respective one of the claws 8 in the circumferential direction to effectively lower the rigidity of the respective one of the claws 8.

<Bearing Unit>

Figure 6:
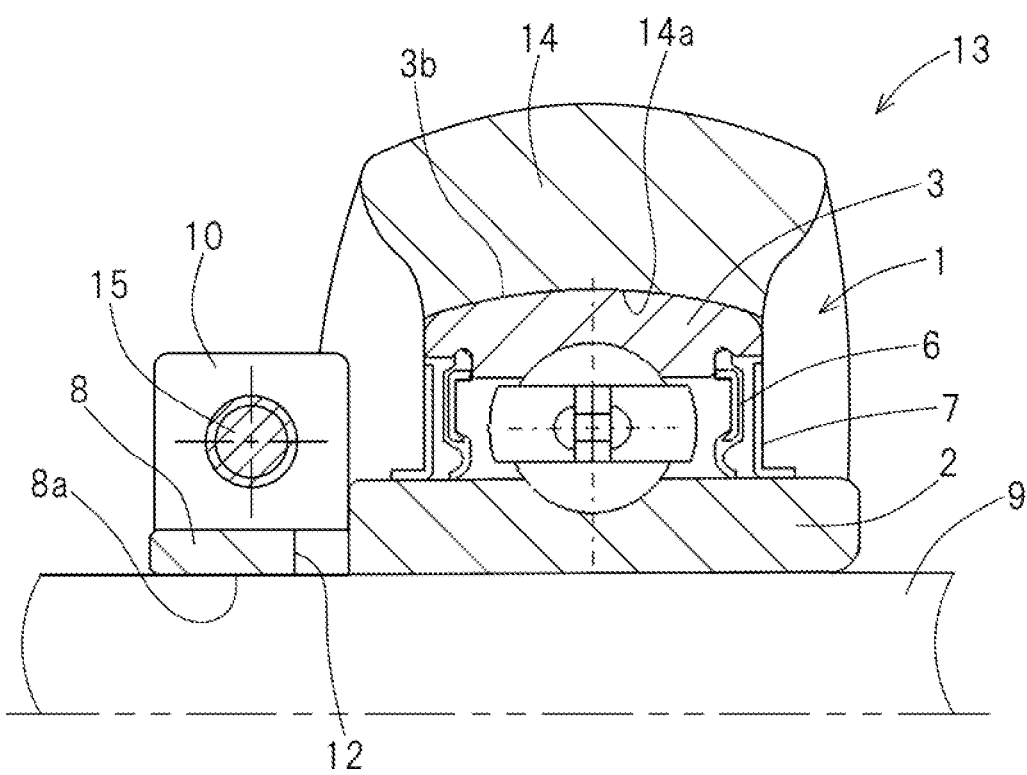
FIG. 6 shows a longitudinal cross sectional view of a bearing unit, highlighting an example use of the bearing in accordance with a given embodiment of the present invention in the bearing unit.

FIG. 6 shows a longitudinal cross sectional view of a bearing unit 13, highlighting an example use of the bearing 1 in accordance with a given embodiment in the bearing unit 13. The bearing unit 13 includes: a bearing housing 14; the bearing 1 disposed in the bearing housing 14 in a self-aligning manner; and the collar 10 serving as a lock mechanism. The bearing housing 14 is shaped like a pillow and has an inner periphery providing a spherical inner diameter 14a which is concave-spherical. The bearing unit 13 exhibits self-aligning capability through the slidable fitting of the outer peripheral surface 3b, which defines the convex-spherical, outer diameter of the outer ring 3 of the bearing 1, with the spherical inner diameter 14a of the bearing housing 14.

<Collar Serving as Lock Mechanism>

The collar 10 has a portion in the circumferential direction that is cut out to define a gap in the circumferential direction which enables the collar 10 to be shrunk in diameter. A tightening screw 15 can be screwed into the air space in the collar 10 adjacent to the gap to bring the opposite free ends of the collar 10 towards each other to reduce the gap. In this way, the collar 10 is made to shrink in diameter to force the inner diameters 8a of the claws 8 against the outer peripheral surface of the shaft 9 for locking the inner ring 2 and the shaft 9 together in a simple and concentric manner.

The number of the plurality of claws 8 can be selected as appropriate. It is also conceivable that the opening 12 is only provided in at least one of the plurality of claws 8. In this case, the number of machining steps can be reduced as compared to when the opening is provided in all of the claws, thus, bringing down the manufacturing cost. The size of the opening 12 does not necessarily have to be the same and can even differ among the claws 8 if necessary. The opening 12 may be a blind hole that is shaped like a so-called, counterbore bole which is provided in the inner peripheral surface or outer peripheral surface of a respective one of the claws 8.

The seals 6 for the bearing 1 can alternatively be in the form of non-contact seals. Further, the slingers 7 can be omitted. While a rolling bearing such as a ball bearing is used for the bearing 1 in the preceding embodiment(s), it is also possible for a plain bearing such as a spherical plain bearing to be used therefor. Furthermore, it is also possible for the bearing 1 to be used in applications other than general industrial machinery.

While embodiments of the present invention have been described thus far, the embodiments disclosed herein are illustrative and not restrictive in all respects. The scope of the present invention is to be indicated by the appended claims rather than by the foregoing description, and is meant to embrace all changes made within the meaning and range of equivalency to the appended claims.

REFERENCE SYMBOLS

1 . . . bearing
2 . . . inner ring
2a . . . raceway groove
3 . . . outer ring
4 . . . rolling element
5 . . . cage
8 . . . claw
9 . . . shaft
10 . . . collar (lock mechanism)
12 . . . opening

What is claimed is:

1. A bearing comprising:
an inner ring made from bearing steel;
an outer ring made from bearing steel;
a plurality of rolling elements disposed between the inner ring and the outer ring; and
a plurality of claws located in a circumferential direction at an end face of the inner ring and protruding from the end face of the inner ring in an axial direction, at least one of the plurality of claws having an opening provided therein,
wherein the plurality of claws are indivisibly and integrally formed in the inner ring.

2. The bearing as claimed in claim 1, wherein the outer ring has an outer peripheral surface which is arranged in a bearing housing in a self-aligning manner.

3. The bearing as claimed in claim 1, wherein the opening is located in a respective one of the plurality of claws in a range that spans from a center of the respective one of the plurality of claws towards a raceway groove of the inner ring in the axial direction.

4. The bearing as claimed in claim 1, wherein the opening has a length which is equal to or shorter than 50% of a length of a respective one of the plurality of claws, as measured in the axial direction.

5. The bearing as claimed in claim 1, wherein the opening has a length which is equal to or shorter than 60% of a length of a respective one of the plurality of claws, as measured in the circumferential direction.

6. The bearing as claimed in claim 1, wherein the plurality of claws have hardnesses that are lower than a hardness of a raceway groove of the inner ring.

7. A bearing device comprising:
an inner ring made from bearing steel;
an outer ring made from bearing steel and arranged outwards of the inner ring;

a plurality of rolling elements disposed between the inner ring and the outer ring;

a shaft which is fittedly coupled to an inner diameter surface of the inner ring;

a plurality of claws located in a circumferential direction at an end face of the inner ring and protruding from the end face of the inner ring in an axial direction, at least one of the plurality of claws having an opening provided therein; and a lock mechanism which fastens the plurality of claws to the shaft, wherein the plurality of claws are indivisibly and integrally formed in the inner ring.

8. A bearing comprising:

an inner ring;

an outer ring;

a plurality of rolling elements disposed between the inner ring and the outer ring; and a plurality of claws located in a circumferential direction at an end face of the inner ring and protruding from the end face of the inner ring in an axial direction, at least one of the plurality of claws having an opening provided therein, the opening being a through hole having a round shape and extending through a respective one of the plurality of claws in a radial direction of the bearing, wherein each of the plurality of claws has a thickness smaller than a maximum thickness of the inner ring, as measured in the radial direction, and each of the plurality of claws defines an inner diameter corresponding to an inner diameter of the inner ring.

* * * * *